United States Patent
Pappas et al.

(10) Patent No.: US 6,466,905 B1
(45) Date of Patent: Oct. 15, 2002

(54) DIFFERENTIATION OF ERROR CONDITIONS IN DIGITAL VOICE COMMUNICATION SYSTEMS

(75) Inventors: Scott James Pappas, Lake Zurich, IL (US); Eric Ferdinand Ziolko, Schaumburg, IL (US); David Lee Weiss, Roselle, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/451,329

(22) Filed: Nov. 30, 1999

(51) Int. Cl.[7] .............................................. G10L 21/02

(52) U.S. Cl. ...................................... 704/227; 704/233

(58) Field of Search ................................ 704/200, 221, 704/226, 227, 228, 233

(56) References Cited

U.S. PATENT DOCUMENTS 5,691,974 A * 11/1997 Zehavi et al. ............... 370/203
5,943,606 A * 8/1999 Kremm et al. .............. 342/358

OTHER PUBLICATIONS

IEEE Conference on Communications, 1994. ICC '94, SUPERCOMM/ICC '94. Ong et al., "Enhanced channel coding using source criteria in speech coders" May 1994. PP 576–579 vol. 1.*

* cited by examiner

*Primary Examiner*—Richemond Dorvil
(74) *Attorney, Agent, or Firm*—Steven R. Santam; Terri S. Hughes (57) ABSTRACT

An apparatus and method for indicating sources of high error conditions, including out-of-range and interference conditions, to a user of a digital voice communication system. When the vocoder (206) of a communication unit (200, 450) silences due to high error conditions, a source of the high error conditions (e.g., out-of-range or interference) is determined based on the signal strength, and a source indicator (218, 220) is generated to inform the user of the source of the high error conditions. In one embodiment, where a repeater (400) is used, sources of high error conditions are detected both inbound to and outbound from the repeater. In an event of high error conditions on the inbound signal path (404), the repeater puts out a distinctive erasure (420, 422, 424) identifying the source. The communication unit (450) detects the erasure and generates a source indicator associated with the erasure. In the event of high error conditions on the outbound signal path, the communication unit determines the source based on the signal strength and generates an appropriate source indicator. By using distinctive source indicators (470, 472, 474, 476), the communication unit thereby informs the user of error conditions on the inbound or outbound path from the repeater.

24 Claims, 6 Drawing Sheets

DIFFERENTIATION OF ERROR CONDITIONS IN DIGITAL VOICE COMMUNICATION SYSTEMS

FIELD OF THE INVENTION

This invention relates generally to digital voice communication systems, including but not limited to radio frequency (RF) communication systems.

BACKGROUND OF THE INVENTION

In recent years, digital communication systems have become an increasingly popular alternative to conventional analog communication systems. Either system typically includes a plurality of receivers, that may be mobile or portable communication units, base stations, or repeaters capable of receiving signals, such as voice signals. As an example of such a system, a first communication unit transmits a voice message via a radio frequency (RF) communication resource directly to a second communication unit. Alternatively, the first communication unit may transmit the voice message to a repeater which in turn retransmits the message to the second communication unit. Analog and digital communication systems fundamentally differ in the manner of transmitting and receiving the voice message and in the manner of accommodating errors in the voice message.

In analog systems, the original analog voice waveform is used to directly modulate an RF carrier, yielding a modulated carrier signal that is transmitted via a RF channel to a receiver. The receiver demodulates the signal to recover the original analog voice waveform, which may include audible noise resulting from channel impairments such as out of range or fringe conditions, or resulting from interference such as co-channel, adjacent channel or multi-path interference. Generally, users of analog systems are accustomed to hearing noise in the recovered signal indicative of the type of error conditions encountered during transmission. For example, error conditions resulting from the receiver approaching the fringe portions or outer limits of a coverage area usually result in weak recovered voice signals and increasing amounts of background noise, whereas error conditions resulting from interference subjects otherwise strong recovered voice signals to periodic interference from other signals. Thus, in an analog system, the user can readily distinguish between the types of channel impairments causing poor quality recovered voice signals. In digital systems, the analog voice waveform is digitized and then encoded prior to modulation and transmission over the RF channel by adding redundant bits that can be used for the detection and correction of errors. When channel impairments are encountered, errors in the received signal can be corrected at the receiver such that the original voice signal can be reconstructed with little or no interference. Generally, therefore, for moderate error conditions, the error correction capability of digital systems allows for transmitting voice messages with better audio quality than analog systems. Clearly, better audio quality is a desirable feature in many respects but it inherently prevents the user from hearing noise in the recovered signal that would otherwise be indicative of error conditions. For example, the user might hear a relatively clear voice signal in a digital system even if the receiver is approaching the fringe portions or outer limits of a coverage area. Moreover, the correction of errors in a digital system will cease when too many errors have occurred in the data. During such high error conditions, the receiver silences, giving the users no indication of what went wrong. The user may conclude during these periods of silence that the system is not working, when in fact the silence is due to channel impairments such as out-of-range or fringe conditions, co-channel or adjacent channel interference. The user has no way of determining what type of error condition is causing the silence. Moreover, when a repeater is used, the user has no way of determining whether the error condition occurred on the inbound- or outbound-side of the repeater.

Accordingly, there is a need for enhancing a digital communication system with a mechanism and/or method for indicating and differentiating between received error conditions. The system will preferably enable users of communication units to distinguish between errors due to out-of-range or fringe conditions and those due to interference conditions. Where a repeater is used, the system will preferably enable users to distinguish between errors occurring on the inbound- or outbound-side of the repeater. The present invention is directed to satisfying or at least partially satisfying the aforementioned needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

The following describes a system for indicating sources of high error conditions, including out-of-range and interference conditions, in a digital voice communications system.

In one embodiment of the present invention, there is provided a method of indicating a source of high error conditions in a communication system. The communication system includes a vocoder adapted to produce a voice signal from a recovered digital signal, the vocoder being periodically inoperable to produce the voice signal in response to high error conditions associated with the recovered digital signal. The method comprises, in an event of the vocoder being inoperable to produce the voice signal, detecting a signal strength of the recovered digital signal. A source of the high error conditions is determined based on the signal strength, and then a source indicator is generated that is associated with the source of the high error conditions. In one embodiment, the source of the high error conditions is selected from among out-of-range and interference conditions.

In another embodiment of the present invention, there is provided a method of indicating a source of high error conditions in a communication system including a repeater. The communication system defines an inbound path to the repeater and an outbound path from the repeater to a communication unit. The repeater is adapted to perform error correction of an inbound signal, and the repeater is periodically inoperable to perform the error correction in response to high error conditions associated with the inbound signal. The method comprises, in an event of the repeater being inoperable to perform the error correction, detecting a signal strength of the inbound signal. A source of the high error conditions on the inbound signal path is determined based on the signal strength, and then a distinctive erasure is generated that is associated with the source of the high error conditions on the inbound signal path. A communication unit receiving a signal on an outbound signal path from the repeater is operable to detect the erasure and generate a source indicator (e.g., noise signal) associated with the erasure.

In still another embodiment of the present invention, there is provided a communication unit operable to indicate a source of high error conditions. The communication unit includes a vocoder adapted to produce a voice signal from a recovered digital signal, the vocoder being periodically inoperable to produce the voice signal in response to high error conditions associated with the recovered digital signal. The communication unit includes determining means (e.g., RSSI Indicator) for determining a signal strength of the recovered digital signal. A threshold comparator is used to determine a source of the high error conditions based on the signal strength and an indicator controller, operably coupled to the threshold comparator, selects a source indicator associated with the source of the high error conditions. In one embodiment, where the communication unit receives signals on an outbound signal path from a repeater, the communication unit includes an erasure detector for detecting distinctive erasures, generated at the repeater, that are indicative of a source of high error conditions on the inbound path to the repeater.

In yet another embodiment of the present invention, there is provided a repeater adapted to receive an inbound signal via an inbound signal path, the repeater being operable to indicate a source of high error conditions on the inbound signal path. The repeater includes an error correction unit adapted to perform error correction of an inbound signal, the error correction unit being periodically inoperable to perform the error correction in response to high error conditions associated with the inbound signal. The repeater includes determining means (e.g., RSSI Indicator) for determining a signal strength of the inbound signal. A threshold comparator is used to determine a source of the high error conditions on the inbound signal path based on the signal strength. An erasure controller, operably coupled to the threshold comparator, selects a distinctive erasure associated with the source of the high error conditions. Thereafter, the distinctive erasure may be sent via an outbound signal path to a communication unit that detects the erasure and generates a source indicator (e.g., noise signal) indicative of the source of high error conditions on the inbound signal path.

Figure 1:
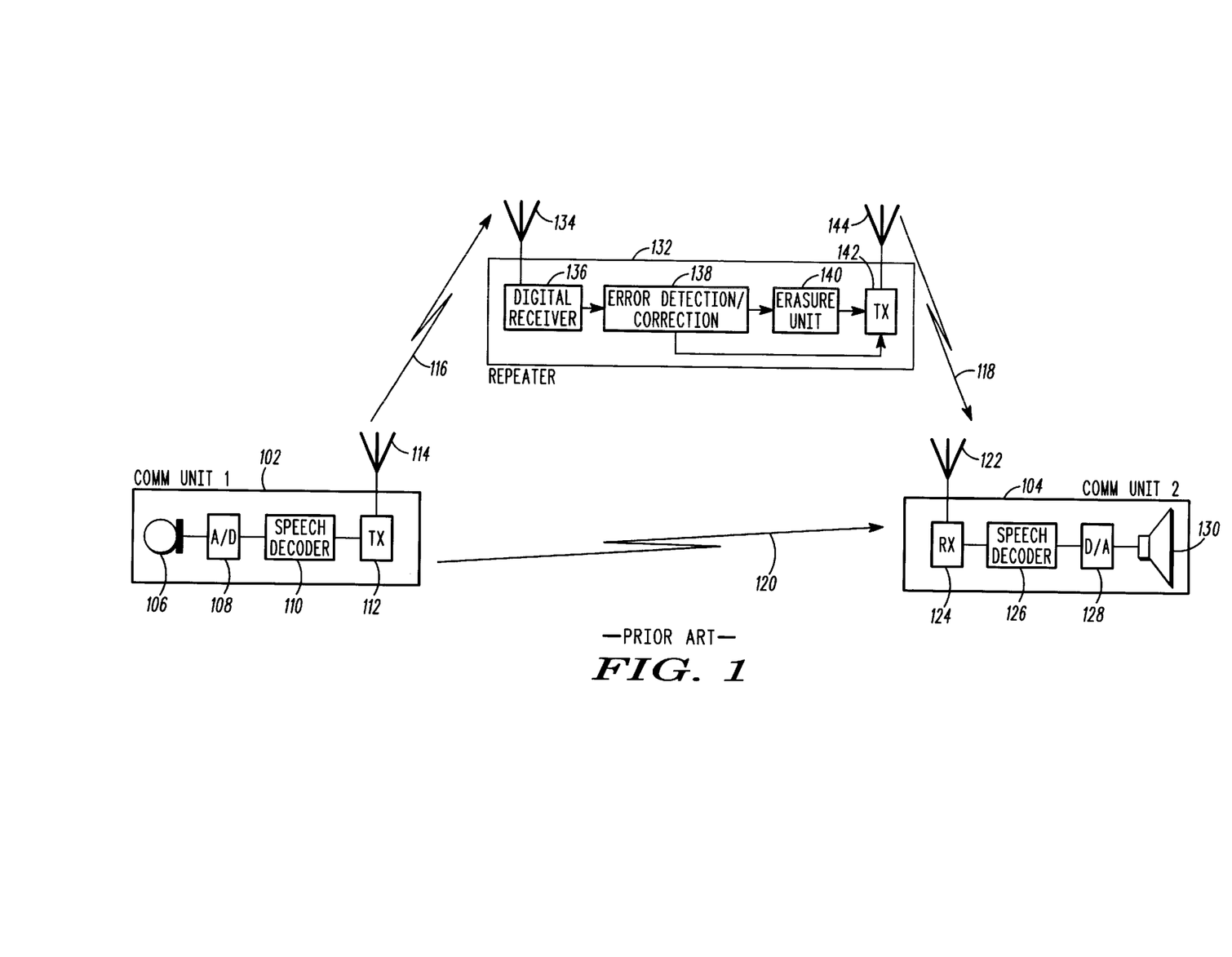
FIG. 1 is a diagram of a prior art digital voice communication system.

Turning now to the drawings and referring initially to FIG. 1, there is shown a prior art digital voice communication system including communication units 102, 104. The communication units 102, 104 may comprise mobile or portable radios such as ASTRO Spectra mobile, or ASTRO Saber or XTS-3000 portable radios, available from Motorola, Inc. For convenience, communication unit 102 is depicted as the source, and communication unit 104 the recipient of a digital voice message. It will be appreciated, however, that communication units 102, 104 may both send and receive digital voice messages. As is well known in the art, a microphone 106 converts acoustic voice signals from a user into an electrical (analog) waveform. An A/D converter 108 digitizes the analog voice waveform and a speech coder ("vocoder") 110 encodes the digitized signal. Transmit circuitry 112 modulates a carrier with the digitized signal and the modulated carrier is transmitted, via antenna 114, over one or more RF communications resources (channels) 116, 118, 120.

Figure 2:
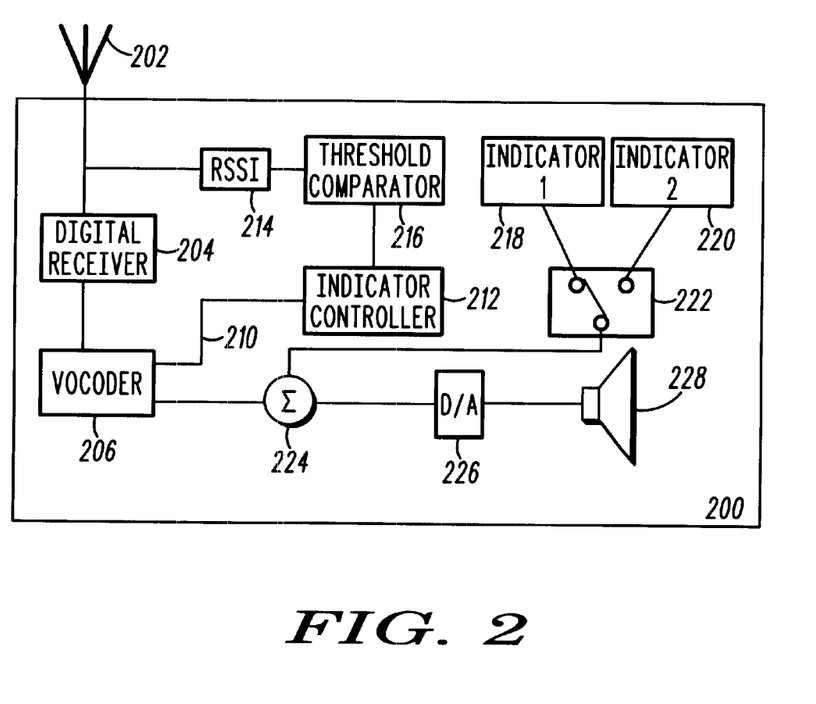
FIG. 2 is a block diagram of a communication unit according to one embodiment of the present invention.

As depicted in FIG. 1, channel 120 comprises a direct communications path between the communication units 102, 104. Alternatively, the signal may be routed through a repeater 132. Channel 116 defines an inbound signal path from the communication unit 102 to the repeater 132 and channel 118 defines an outbound signal path from the repeater 132 to the communication unit 104. Whether direct communication or a repeater is used, a modulated carrier signal is received, via antenna 122, at the communication unit 104. Receive circuitry 124 demodulates the carrier, yielding a recovered digital signal that is provided to a speech decoder 126 ("vocoder"). For moderate error conditions, the speech decoder 126 is operable to decode the recovered signal, yielding a digitized voice signal. The digitized voice signal, if present, is converted to an analog voice waveform by D/A converter 128 and played, via speaker 130, to a user of the communication unit 104. Periodically, however, due to various channel impairments in the communication channel(s) 116, 118 or 120, the speech decoder 126 "silences" or otherwise is inoperable to decode the recovered signal. In that case, the user of the communication unit 104 will not receive a voice signal. In such prior art systems, when this occurred, the user had no way of determining what caused the silence. According to principles of the present invention, there is provided a communication unit that differentiates between received error conditions and indicates to the user what types of error conditions caused the silence. One embodiment of such a communication unit is shown in FIG. 2. The communication unit 200 includes an antenna 202, a digital receiver 204, a vocoder 206, an indicator controller 212, received signal strength indicator (RSSI) 214, threshold comparator 216, indicators 218, 220, switch 222, audio summer 224, D/A converter 226 and speaker 228. The antenna 202 may comprise any antenna capable of receiving a modulated carrier signal, which signal may be provided directly from another communication unit (channel 120, FIG. 1) or via a repeater (channels 116, 118, FIG. 1). The digital receiver 204 may comprise any receiver capable of detecting and demodulating the modulated carrier signal, yielding a recovered digital signal that is provided to vocoder 206. For moderate error conditions, the vocoder 206 decodes the recovered signal, yielding a digitized voice signal that is converted to an analog voice waveform by D/A converter 226 and played, via speaker 228, to a user of the communication unit 200, as in the prior art.

Under high error conditions, when the vocoder 206 silences, it provides a silence indicator signal 210 to the indicator controller 212. The RSSI 214 and threshold comparator 216 allow for determining the source of the high error conditions based on the signal strength of the recovered digital signal and, depending on the source, the indicator controller 212 activates the switch 222 to select an indicator 218 or 220 associated with the source of the high error conditions. In one embodiment, the indicators 218, 220 comprise distinctive noise signals that are played, when selected, via speaker 228. For example, indicator 218 might comprise a shaped noise signal that is selected and played when the source of errors is an out-of-range condition, whereas indicator 220 might comprise a "buzz" signal, distinct from the shaped noise signal of indicator 218, that is selected and played when the source of errors is an interference condition. In this manner, the user of the communication unit is able to ascertain the source of the high error conditions (e.g., out-of-range or interference) upon hearing the shaped noise signal or buzz sound of the corresponding indicator 218, 220. In one embodiment, the absence of an indicator (e.g., silence) or a third indicator (not shown) is used to alert the user that the source of high error conditions is neither due to interference nor out-of-range conditions but is otherwise undetermined. It will be appreciated that virtually any type of audible or visual indicator, including, for example, stored voice messages, distinctive light signals, color indicators, symbols, characters, and so forth may be used to alert the user of the various source(s) of the high error conditions.

Figure 3:
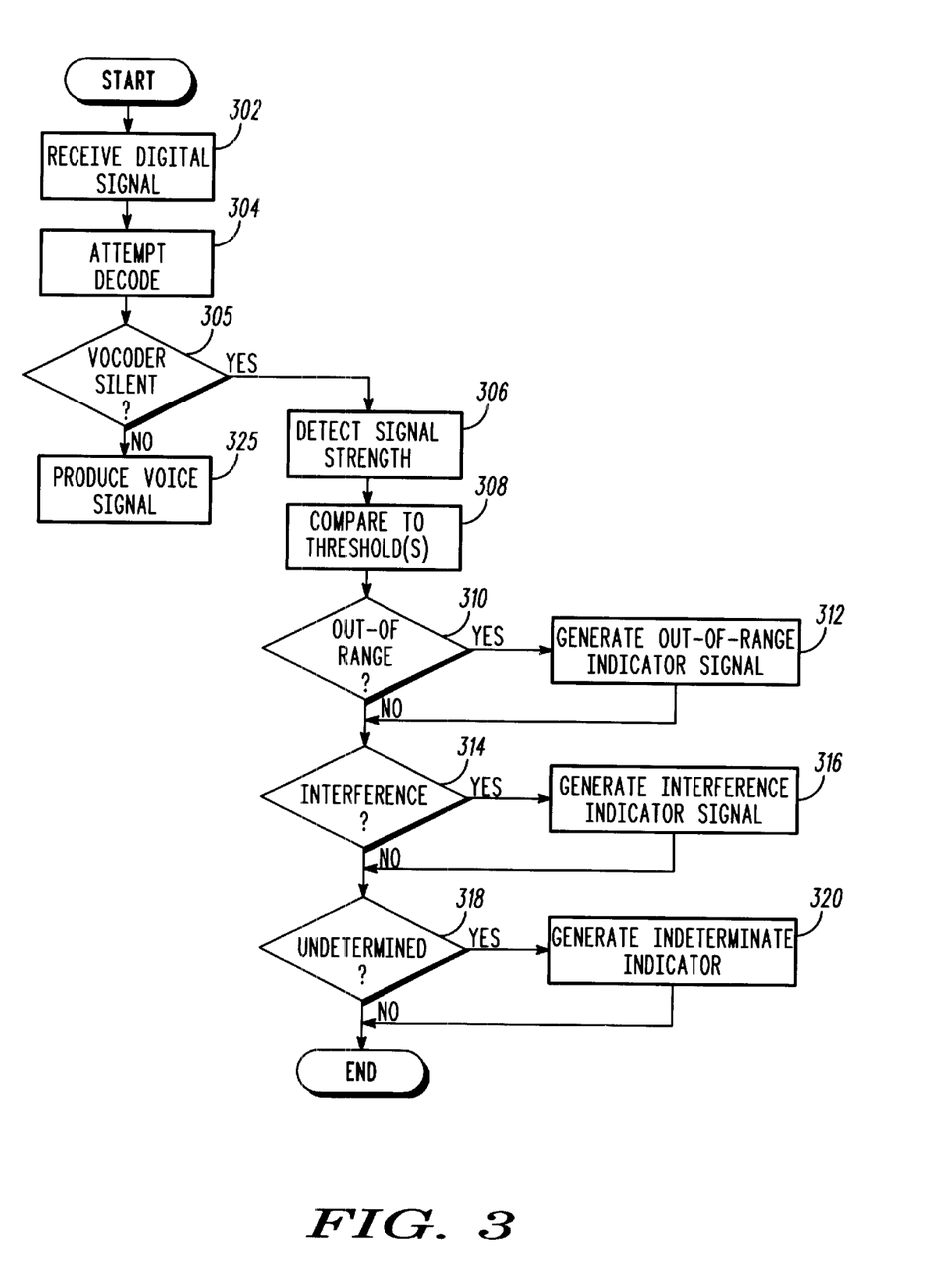
FIG. 3 is a flowchart showing steps executable by the communication unit of FIG. 2 to indicate and differentiate between received error conditions.

FIG. 3 is a flowchart useful for explaining the operation of the communication unit 200 in greater detail. At step 302, the signal is recovered by the digital receiver 204. Next, at step 304, the vocoder attempts to decode the recovered digital signal. At step 305, if the vocoder is unable to decode the recovered signal (i.e., the vocoder is silent), the RSSI 214 detects (step 306) the signal strength of the recovered digital signal. At step 308, the signal strength information from the RSSI 214 is routed to the threshold comparator 216, where it is compared to predetermined threshold(s) corresponding to one or more source(s) of high error conditions. The RSSI 214 and threshold comparator 216 may comprise separate hardware circuits or software algorithms.

By comparing the signal strength of the recovered digital signal to the threshold(s), a source of the high error conditions can be determined. It will be appreciated that any number of thresholds may be used, corresponding to any number of error conditions that might be encountered. Generally, the specific thresholds used are somewhat arbitrary and will vary upon the receiver performance of the communication unit, i.e., the minimum signal level that may be picked up by the receiver. In the embodiment of FIG. 3, two thresholds are used: a first threshold associated with out-of-range conditions and a second threshold associated with interference conditions. The signal strength of the recovered digital signal is compared to the first and second thresholds at step 308. Although these thresholds are somewhat arbitrary, as noted above, the threshold associated with out-of-range conditions will generally be lower than the threshold associated with interference conditions. For example, in one embodiment, the out-of-range threshold might be 20 dB above the minimum signal level and the interference threshold might be 30 dB above the minimum signal level. Of course, any of several other threshold levels might be used.

If, at step 310, the signal strength is lower than the out-of-range threshold, this would indicate an out-of-range condition is the source of the errors and the indicator controller 212 selects an out-of-range indicator signal at step 312. Conversely, if at step 314 the signal strength is higher than the interference threshold, this would indicate an interference condition is the source of the errors and the indicator controller 212 selects an interference indicator signal at step 316. As previously noted, the indicator signals may comprise virtually any type of audible or visual signal, including, shaped noise signals, buzzes, tones, stored voice messages, distinctive light signals, color indicators, symbols, characters, and the like. If, at step 318, the signal strength is between the out-of-range and interference thresholds, this indicates that the source of the errors is neither due to interference nor out-of-range conditions but is otherwise undetermined. In response to such an indeterminate finding of the error condition, the indicator controller selects an "indeterminate indicator" at step 320. In one embodiment, the indeterminate indicator comprises silence, resulting from the non-selection of audible indicator signals 218, 220. Alternatively, a third audible or visual indicator might be used to indicate that the source of the errors is undetermined.

If, at step 305 the vocoder is able to decode the recovered signal, yielding a voice signal, the voice signal is produced (step 325) in generally the same manner known in the art, without generating any indicator signals. Thus, during periods of speech, there is no degradation of audio quality caused by added noise signals.

Figure 4:
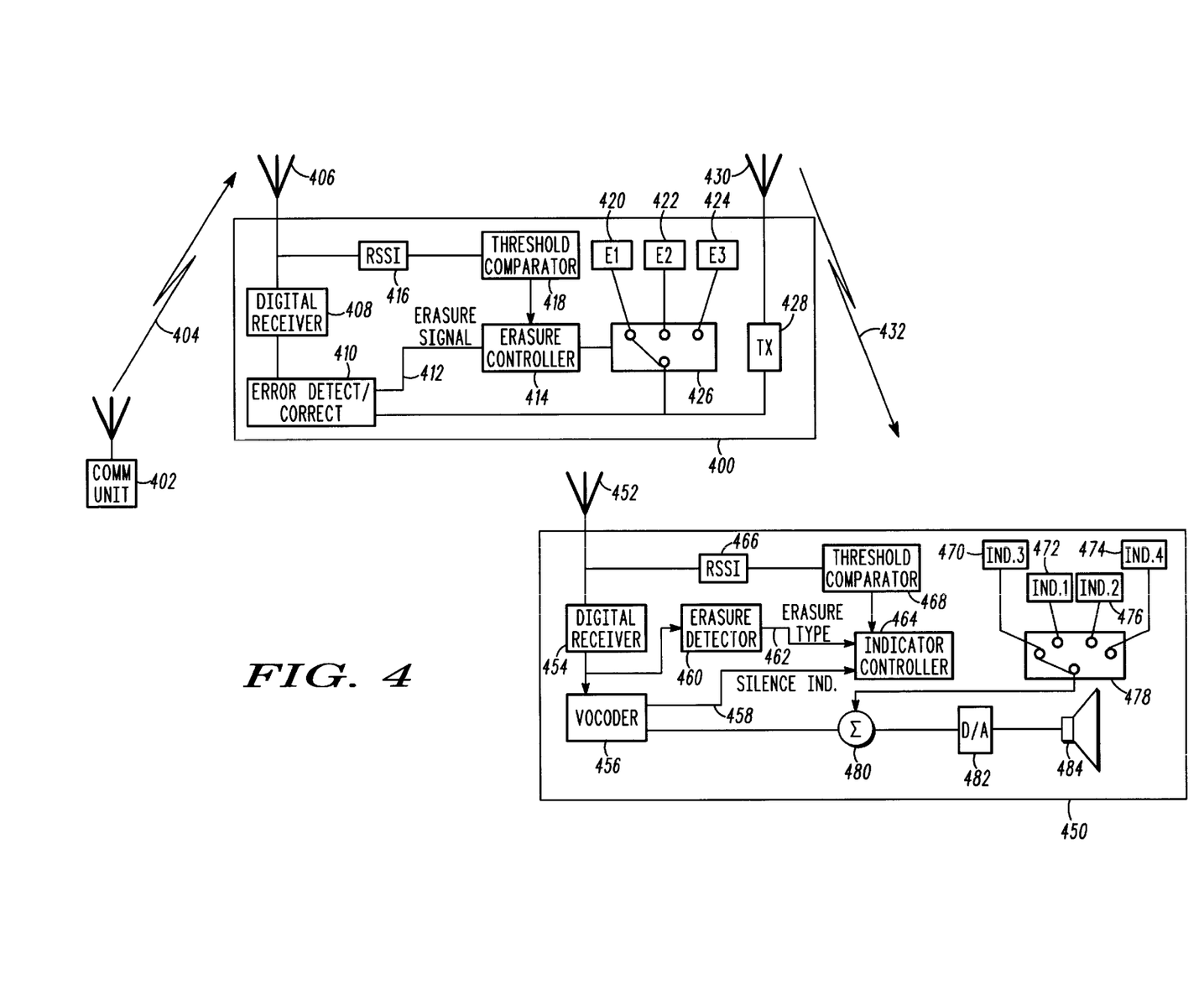
FIG. 4 is a diagram of a digital voice communication system using a repeater according to one embodiment of the present invention.

Now turning to FIG. 4, there is shown a digital voice communication system using a repeater 400. As depicted in FIG. 4, RF communications resource ("channel") 404 defines an inbound signal path from a transmitting communication unit 402 to the repeater 400, and RF communications resource ("channel") 432 defines an outbound signal path from the repeater 400 to a receiving communication unit 450. Thus, from the standpoint of the receiving communication unit 450, there are two paths, inbound path 404 and outbound path 432, where high error conditions may occur. An antenna 406 receives the incoming signal via inbound signal path 404. A digital receiver 408 detects and demodulates the inbound signal, yielding a recovered digital signal that is provided to an error detection/correction circuit 410. Generally, the error detection/correction circuit 410 is adapted to detect and correct errors in the recovered signal, yielding an error-corrected digital signal. When this occurs, transmit circuitry 428 modulates a carrier with the error-corrected digital signal and the modulated carrier is transmitted, via antenna 430, over channel 432 to the receiving communication unit 500, in generally the same manner known in the art.

Occasionally, however, error conditions on the inbound signal path 404 degrade the signal to an extent that the repeater cannot perform the error correction. In prior art systems, there was no mechanism for indicating what type of error conditions occurred on the inbound signal path. According to principles of the present invention, the repeater 400 includes an RSSI 416 and threshold comparator 418 to determine the source of the high error conditions on the inbound signal path, based on the signal strength of the recovered digital signal. Depending on the source, an erasure controller 414 activates a switch 426 to select a distinctive erasure 420, 422 or 424 associated with the source of the high error conditions on the inbound signal path. An erasure is an easily recognized pattern that is not a vocoder pattern. The generation of distinctive erasures is well known to practitioners skilled in the art and will not be described in detail herein. At any rate, transmit circuitry 428 modulates a carrier with the distinctive erasure and the modulated carrier is transmitted, via antenna 430, over channel 432 to the receiving communication unit 450.

Figure 5:
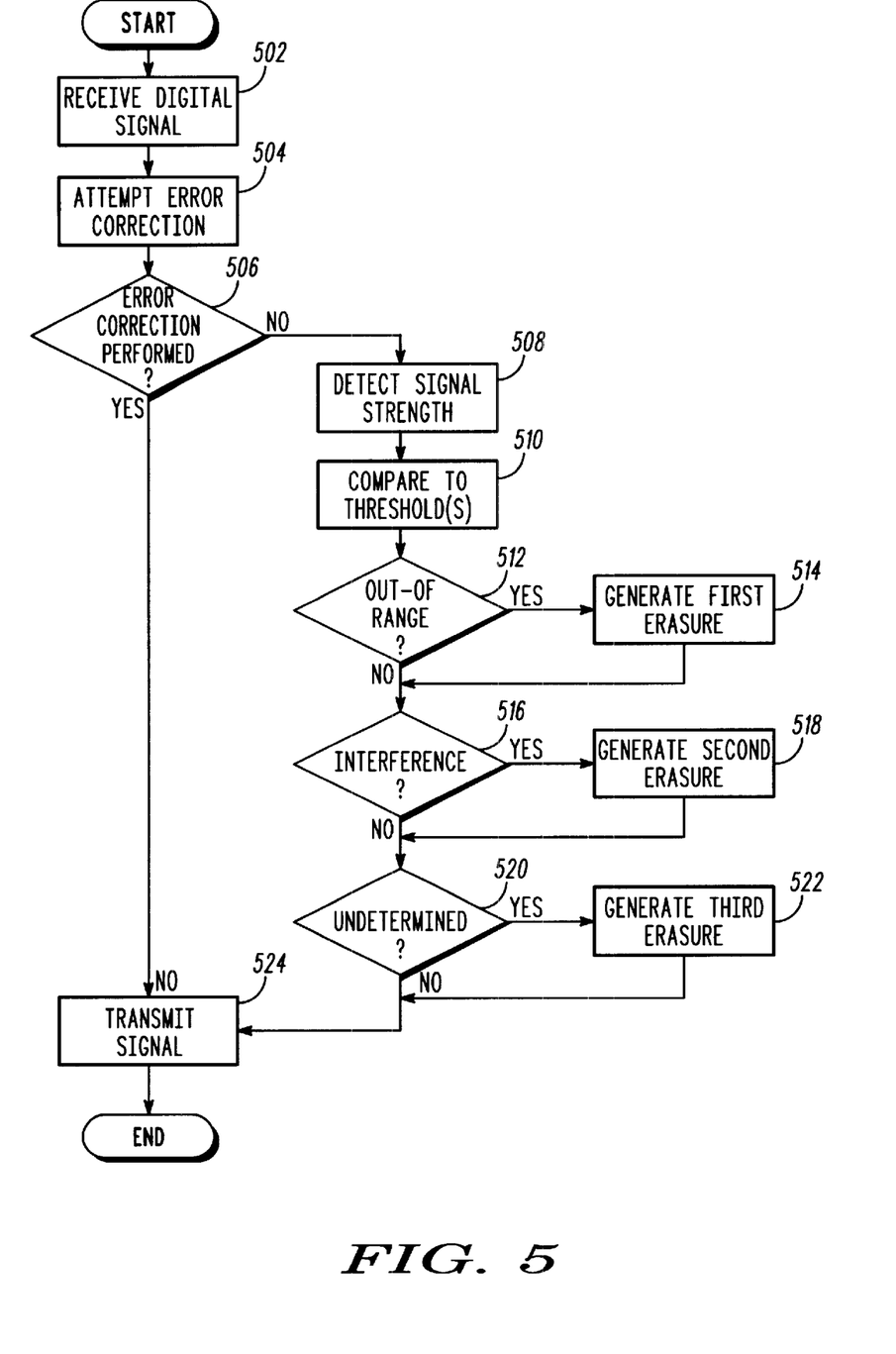
FIG. 5 is a flowchart showing steps executable by the repeater of FIG. 4 to differentiate between received error conditions on an inbound signal path.

FIG. 5 is a flowchart showing operation of the repeater 400 according to one embodiment of the invention. At step 502, the inbound signal is recovered by the digital receiver 408. Next, at step 504, the error detect/correct circuit 410 attempts to correct errors in the recovered digital signal. At step 506, if the signal is degraded such that the error detect/correct circuit 410 is unable to correct errors in the recovered signal, the RSSI 416 detects (step 508) the signal strength of the recovered digital signal. At step 510, the signal strength information from the RSSI 416 is routed to the threshold comparator 418. The error detect/correct circuit 410, erasure controller 414, RSSI 416 and threshold comparator 418 may comprise hardware circuits or software algorithms.

The threshold comparator 418 operates in generally the same manner as the threshold comparator 216 described in relation to FIG. 2. That is, it compares the signal strength of the recovered digital signal to predetermined threshold(s) corresponding to one or more source(s) of high error conditions. The difference is that in the case of threshold comparator 418, there is a determination of a source of errors on the inbound path 404 to the repeater 400, whereas in FIG. 2, the source of errors is not associated with any particular path. (The system of FIG. 2 relates to a communication unit in a system with or without a repeater.) Generally, the threshold comparator 418 may use any number of thresholds, corresponding to any number of error conditions that might be encountered on the inbound path 404. In a preferred embodiment, the threshold comparator 418 uses two thresholds: a first threshold associated with out-of-range conditions and a second threshold associated with interference conditions on the inbound path 404. The signal strength of the recovered digital signal is compared to the first and second thresholds at step 510. Similar to the corresponding thresholds described in relation to FIG. 2, these thresholds are somewhat arbitrary, except the threshold associated with out-of-range conditions will generally be lower than the threshold associated with interference conditions. For example, in one embodiment, the out-of-range (inbound) threshold might be 20 dB above the minimum signal level and the interference (inbound) threshold might be 30 dB above the minimum signal level.

If, at step 512, the signal strength is lower than the out-of-range threshold, this would indicate an out-of-range (inbound) condition is the source of the errors and the erasure controller 414 generates a distinctive erasure ("first erasure") associated with the out-of-range (inbound) condition at step 514. Conversely, if at step 516 the signal strength is higher than the interference threshold, this would indicate an interference condition is the source of the errors and the erasure controller 414 generates a second erasure associated with the interference (inbound) condition at step 518. If, at step 520, the signal strength is between the out-of-range and interference thresholds, the source of the errors is undetermined and a third erasure is generated (step 522).

Returning again to FIG. 4, the communication unit 450 includes an erasure detector 460 operable to detect the erasure and generate a source indicator (e.g., noise signal) associated with the erasure, hence identifying the source of the errors on the inbound signal path. The communication unit 450 also includes an antenna 452, digital receiver 454, vocoder 456, indicator controller 464, received signal strength indicator (RSSI) 466, threshold comparator 468, indicators 470, 472, 474, 476, switch 478, audio summer 480, D/A converter 482 and speaker 484. The antenna 452, digital receiver 454, vocoder 456, RSSI 466, threshold comparator 468, D/A converter 482 and speaker 484 operate in generally the same manner as the corresponding elements of the communication unit 200 described in relation to FIG. 2.

Figure 6:
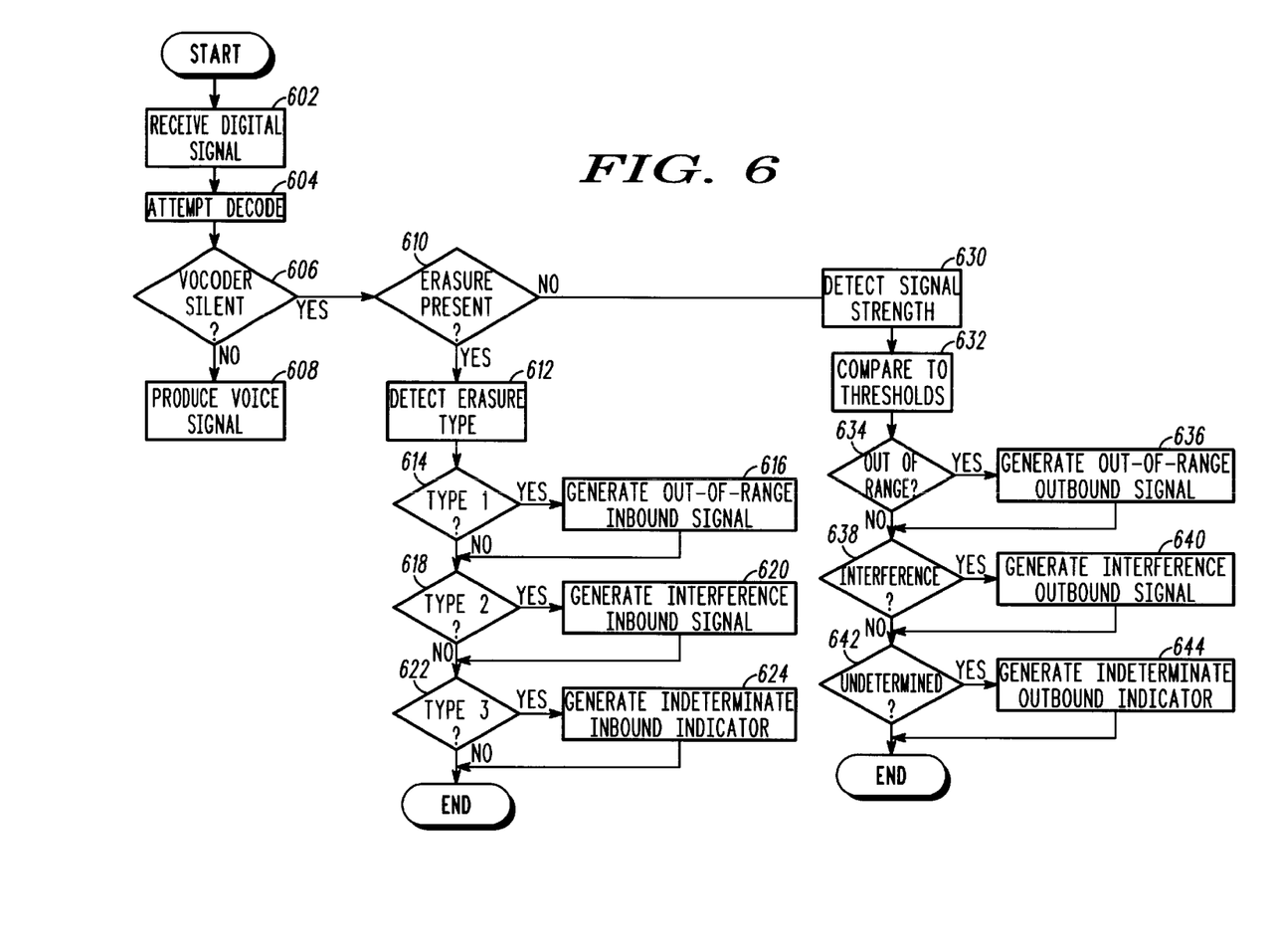
FIG. 6 is a flowchart showing steps executable by the communication unit of FIG. 4 to differentiate between received error conditions occurring on the inbound or outbound signal path.

FIG. 6 is a flowchart showing a method of operating the communication unit 450 according to the invention. At step 602, the signal is recovered by the digital receiver 454. Next, at step 604, the vocoder 456 attempts to decode the recovered digital signal. At step 606, if the vocoder is unable to decode the recovered signal (i.e., the vocoder is silent), the erasure detector 460 determines at step 610 whether an erasure is present in the recovered signal. If an erasure is present, it is known that the source of errors occurred on the inbound side of the repeater, and the type of erasure (e.g., type 1, type 2, type 3) is detected at step 612. In one embodiment, type 1 erasures are indicative of an out-of-range condition, type 2 erasures are indicative of an interference condition, and type 3 erasures are indicative of an undetermined error condition on the inbound side of the repeater. Hence, at step 614, if a type 1 erasure is detected, the indicator controller 464 selects an out-of-range (inbound) indicator signal at step 616. If at step 618 a type 2 erasure is detected, the indicator controller 464 selects an interference (inbound) indicator signal at step 620. If at step 622 a type 3 erasure is detected, the source of the inbound errors is neither due to interference nor out-of-range conditions but is otherwise undetermined, causing the indicator controller to select an "indeterminate inbound indicator" at step 624. In one embodiment, the indeterminate inbound indicator comprises silence, resulting from the non-selection of audible indicator signals. Alternatively, an audible or visual indicator other than those reserved for out-of-range or interference (inbound) conditions might be used as the indeterminate inbound indicator.

If at step 610 an erasure is not present, it is known that the source of errors occurred on the outbound side of the repeater, and the process proceeds to step 630, etc. to determine, if possible, the source of the errors on the outbound side. At step 630, the RSSI 466 detects the signal strength of the recovered digital signal. At step 632, the signal strength information from the RSSI 466 is compared, by the threshold comparator 468, to thresholds associated with out-of-range conditions and interference conditions on the outbound path.

If, at step 634, the signal strength is lower than the out-of-range threshold, this would indicate an out-of-range (outbound) condition is the source of the errors and the indicator controller 464 generates an out-of-range (outbound) indicator signal at step 636. If at step 638 the signal strength is higher than the interference threshold, this would indicate an interference (outbound) condition is the source of the errors and the indicator controller 464 generates an interference (outbound) indicator signal at step 640. The indicator signals associated with either inbound or outbound errors may comprise virtually any type of audible or visual signal, including, shaped noise signals, buzzes, tones, stored voice messages, distinctive light signals, color indicators, symbols, characters, and the like. If, at step 642, the signal strength is between the out-of-range and interference thresholds, the source of the outbound errors is neither due to interference nor out-of-range conditions but is otherwise undetermined, causing the indicator controller to select an "indeterminate outbound indicator" at step 644. In one embodiment, the indeterminate outbound indicator comprises silence, resulting from the non-selection of audible indicator signals. Alternatively, an audible or visual indicator other than those reserved for out-of-range or interference (inbound or outbound) conditions might be used as the indeterminate outbound indicator.

If, at step 606 the vocoder is able to decode the recovered signal, yielding a voice signal, the voice signal is produced (step 608) in generally the same manner known in the art, without generating any inbound or outbound indicator signals. Thus, during periods of speech, there is no degradation of audio quality caused by added noise signals.

The present disclosure therefore has identified devices and methods for indicating and differentiating between received error conditions, including out-of-range and interference conditions. Further, where a repeater is used, the present disclosure has identified devices and methods for differentiating between errors occurring inbound or outbound from the repeater.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system including a vocoder adapted to produce a voice signal from a recovered digital signal, the vocoder being periodically inoperable to produce said voice signal in response to high error conditions associated with the recovered digital signal, a method comprising performing, in an event of the vocoder being inoperable to produce said voice signal, the steps of:

determining a source of the high error conditions; and
   generating a source indicator associated with the source of the high error conditions.

2. The method of claim 1 wherein the step of determining a source comprises:

detecting a signal strength of the recovered digital signal; and
   determining a source of the high error conditions based on the signal strength.

3. The method of claim 2 comprising:

determining a first signal strength threshold associated with out-of-range conditions;
   determining a second signal strength threshold associated with interference conditions;
   comparing the signal strength of the recovered digital signal to the first and second signal strength thresholds;
   generating a first source indicator indicative of an out-of-range condition if the signal strength of the recovered digital signal is lower than the first signal strength threshold; and
   generating a second source indicator indicative of an interference condition if the signal strength of the recovered digital signal is higher than the second signal strength threshold.

4. The method of claim 3 wherein the first and second source indicators comprise uniquely identifiable noise signals.

5. The method of claim 3 further comprising the step of selecting a third source indicator indicative of an indeterminate error condition if the signal strength of the recovered digital signal is between the first and second signal strength thresholds.

6. In a communication system including an inbound signal path to a repeater and an outbound signal path from the repeater to a communication unit, the inbound and outbound signal paths being periodically subject to high error conditions affecting a recovered digital signal at the communication unit, a method comprising performing, in an event of high error conditions on the inbound signal path, the steps of:

determining, at the repeater, a source of the high error conditions on the inbound signal path;
   generating, at the repeater, a distinctive erasure associated with the source of the high error conditions on the inbound signal path;
   detecting, at the communication unit, the distinctive erasure; and
   generating, at the communication unit, a source indicator associated with the distinctive erasure.

7. The method of claim 6 wherein the step of determining a source of the high error conditions on the inbound signal path is accomplished by selecting a source from a group consisting of out-of-range, interference and indeterminate error conditions on the inbound signal path.

8. A communication unit comprising:

a vocoder adapted to produce a voice signal from a recovered digital signal, the vocoder being periodically inoperable to produce said voice signal in response to high error conditions associated with the recovered digital signal;
   determining means for determining a signal strength of the recovered digital signal;
   a threshold comparator being operable to determine a source of the high error conditions based on the signal strength; and
   an indicator controller, operably coupled to the threshold comparator, for selecting a source indicator associated with the source of the high error conditions.

9. The communication unit of claim 8 wherein the threshold comparator determines the source to be an out-of-range condition if the signal strength of the recovered digital signal is lower than an out-of-range signal strength threshold.

10. The communication unit of claim 8 wherein the threshold comparator determines the source to be an interference condition if the signal strength of the recovered digital signal is higher than an interference signal strength threshold.

11. The communication unit of claim 8 wherein the threshold comparator determines the source to be an out-of-range condition if the signal strength of the recovered digital signal is lower than an out-of-range signal strength threshold, an interference condition if the signal strength of the recovered digital signal is higher than an interference signal strength threshold, and an indeterminate error condition if the signal strength of the recovered digital signal is between the out-of-range and interference signal strength thresholds.

12. The communication unit of claim 11 wherein the indicator controller selects a first source indicator indicative of an out-of-range condition if the threshold comparator determines the source to be an out-of-range condition, and a second source indicator indicative of an interference condition if the threshold comparator determines the source to be an interference condition.

13. The communication unit of claim 12 wherein the indicator controller selects a third source indicator indicative of an indeterminate error condition if the threshold comparator determines the source to be neither an out-of-range nor interference condition.

14. The communication unit of claim 8 being operable in a communication system including a repeater, the communication system defining an inbound signal path to the repeater and an outbound signal path from the repeater to the communication unit, the communication unit comprising:

an erasure detector operable to detect a distinctive erasure, generated at the repeater, indicative of a source of high error conditions on the inbound signal path.

15. In a communication system including a repeater receiving an inbound signal via an inbound signal path, the repeater being adapted to perform error correction of the inbound signal, the repeater being periodically inoperable to perform said error correction in response to high error conditions associated with the inbound signal, a method comprising performing, in an event of the repeater being inoperable to perform said error correction, the steps of:

determining a source of the high error conditions on the inbound signal path; and generating a source indicator associated with the source of the high error conditions.

16. The method of claim 15 wherein the step of determining a source comprises: detecting a signal strength of the inbound signal; and determining a source of the high error conditions based on the signal strength.

17. The method of claim 16 comprising:

determining a first signal strength threshold associated with out-of-range conditions;

determining a second signal strength threshold associated with interference conditions;

comparing the signal strength of the recovered digital signal to the first and second signal strength thresholds;

generating a first source indicator indicative of an out-of-range condition if the signal strength of the inbound signal is lower than the first signal strength threshold; and generating a second source indicator indicative of an interference condition if the signal strength of the inbound signal is higher than the second signal strength threshold.

18. The method of claim 17 further comprising the step of generating a third source indicator indicative of an indeterminate error condition if the signal strength of the recovered digital signal is between the first and second signal strength thresholds.

19. The method of claim 18 wherein the first, second and third source indicators comprise distinctive erasures.

20. A repeater comprising:

an error correction unit adapted to perform error correction of an inbound signal, the error correction unit being periodically inoperable to perform said error correction in response to high error conditions associated with the inbound signal;

determining means for determining a signal strength of the inbound signal;

a threshold comparator being operable to determine a source of the high error conditions on an inbound signal path based on the signal strength; and an erasure controller, operably coupled to the threshold comparator, for selecting a distinctive erasure associated with the source of the high error conditions on the inbound signal path.

21. The repeater of claim 20 wherein the threshold comparator determines the source to be an out-of-range condition if the signal strength of the inbound signal is lower than an out-of-range signal strength threshold.

22. The repeater of claim 20 wherein the threshold comparator determines the source to be an interference condition if the signal strength of the inbound signal is higher than an interference signal strength threshold.

23. The repeater of claim 20 wherein the threshold comparator determines the source to be an out-of-range condition if the signal strength of the inbound signal is lower than an out-of-range signal strength threshold, an interference condition if the signal strength of the inbound signal is higher than an interference signal strength threshold, and an indeterminate error condition if the signal strength of the inbound signal is between the out-of-range and interference signal strength thresholds.

24. The repeater of claim 20 wherein the erasure controller selects a first erasure indicative of an out-of-range condition if the threshold comparator determines the source to be an out-of-range condition, a second erasure indicative of an interference condition if the threshold comparator determines the source to be an interference condition, and a third erasure indicative of an indeterminate error condition if the threshold comparator determines the source to be neither an out-of-range nor interference condition.

* * * * *